Jan. 24, 1961  W. V. SULKOWSKI  2,969,248
SHAFT SEAL
Filed April 19, 1957

INVENTOR.
Walter V. Sulkowski
BY
Robert F. Hause
ATTORNEY

United States Patent Office 2,969,248
Patented Jan. 24, 1961

2,969,248
SHAFT SEAL

Walter V. Sulkowski, Williamsville, N.Y., assignor to National Gypsum Company, Buffalo, N.Y., a corporation of Delaware Filed Apr. 19, 1957, Ser. No. 653,787

1 Claim. (Cl. 286—1)

This invention relates to means for sealing against leakage around rotary shafts which project through a container wall and is particularly directed to a floating seal for mounting about a shaft projecting through the walls of a gypsum calcining apparatus.

The structure of the present invention is particularly useful and advantageous when constructed and employed in a continuous calcining apparatus for gypsum as disclosed in U.S. Patent 2,788,960, of S. D. Skinner and L. H. Seufert.

In the gypsum calcining apparatus of Skinner and Seufert, several tier units are arranged to contain a plurality of intermeshing screw conveyor members, each screw conveyor member having an end shaft portion, at each end thereof, fitted through suitable stuffing boxes in the ends of the calciner.

During operation of the gypsum calciner, calcining gypsum material is continually disposed immediately inward of the end wall thereof, and, without provision for the avoidance thereof, will tend to flow through the essential cut-out portion of the end wall through which the end shaft portions extend. Due to the inherent eccentricity of the shaft, and because of the unusual flowability calcining gypsum, the necessary sealing function could not be maintained to a desired degree by prior means.

A principal object of the present invention is to provide an improved structure at the ends of a gypsum continuous calciner, whereat the shaft end portions extend therethrough.

An object of the invention is to provide an improved shaft seal for use with materials of the nature of calcining gypsum.

A further object of the invention is to provide an improved shaft seal adaptable to free movement as required to function in view of the inherent eccentricity of a large screw shaft.

These and numerous other objects and advantages will appear more fully when considered in connection with the following detailed description of a preferred embodiment of the invention and the accompanying drawings in which.

Figure 2:
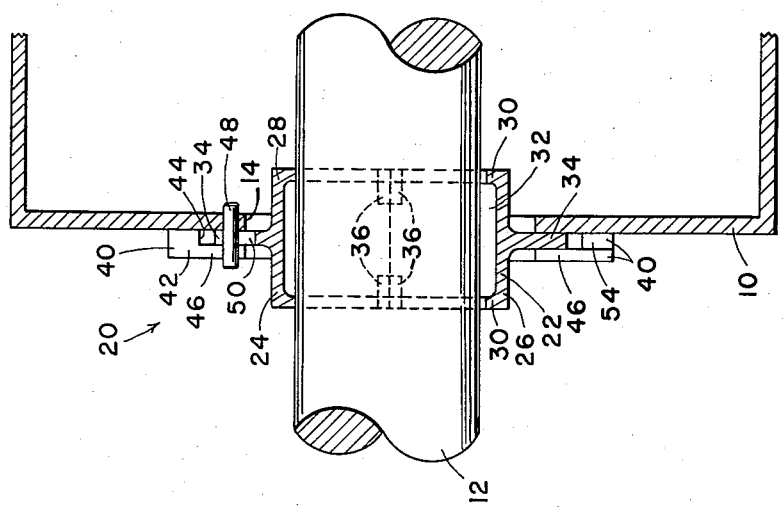
Fig. 2 is a sectional view of the calciner unit and seal of Fig. 1, taken on line 2—2 of Fig. 1.
Figure 1:
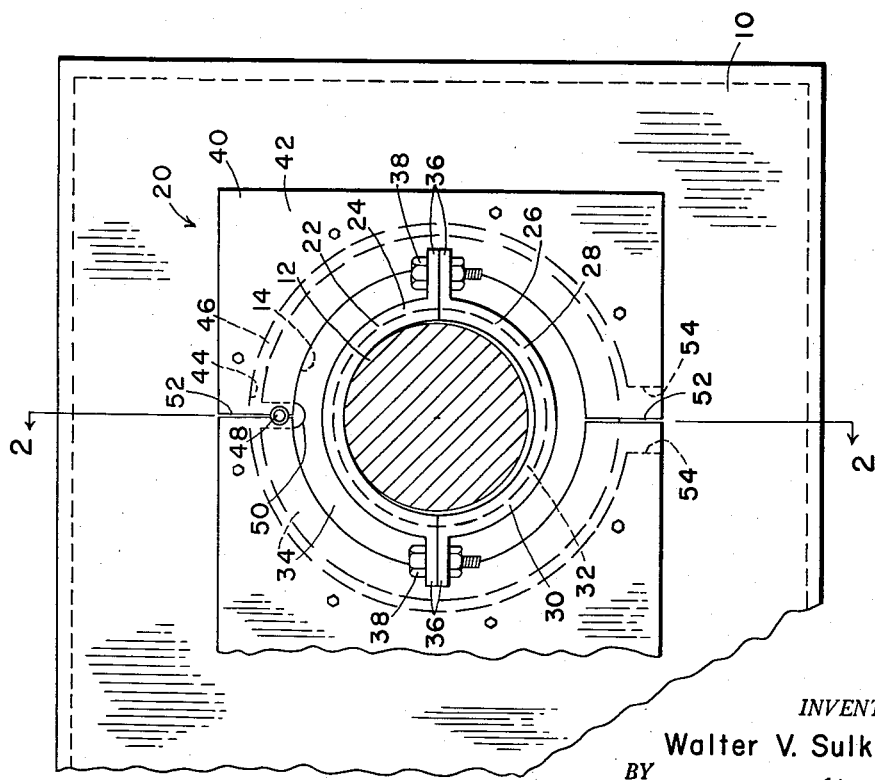
Fig. 1 is an end view of a gypsum calciner unit having a shaft seal disposed about a shaft in accordance with the invention.

Referring to the drawings, the numeral 10 represents the end wall of a gypsum calciner, of the type disclosed in U.S. Patent No. 2,788,960, issued April 16, 1957, to Skinner and Seufert. A portion of shaft 12 is disposed extending through a circular cut-out portion 14 of end wall 10.

Mounted on the outer face of end wall 10 is a split, floating shaft seal structure 20. Shaft seal structure 20 includes a split, annular seal ring 22 having an upper ring half 24 and a lower ring half 26, each half similar in structure to the other half in most respects. Seal ring 22 is disposed about shaft 12, having an axially wide, radially inner, cylinder 28, grooved on the inner face thereof to form two axially outer, radially inwardly extending, annular flanges 30 at the opposite axial ends thereof. Flanges 30 have an inner radius in the order of .020 inch greater than the radius of shaft 12. There is thus formed between flanges 30 a radially inwardly directed, annular, material retaining groove 32. A relatively thin annular, outer flange 34 extends radially outward from cylinder 28, of ring 22.

The two halves 24 and 26, of seal ring 22, have suitable complementary flanges 36 extending outward at their respective abutting faces, which are affixed together by bolts 38.

A flat retainer plate 40 is bolted onto the outer face of end wall 10, around shaft 12, and is formed of portions of two different thicknesses. Retainer plate 40 has a radially outer portion 42 of a thickness greater than the thickness of outer flange 34 of seal ring 22. The thick outer portion 42 of plate 40 has an inner circular periphery 44 of a radius substantially greater than the outermost radius of flange 34, the circular periphery 44 being disposed in spaced relation about the outer periphery of flange 34.

Retainer plate 40 further includes a relatively thinner, annular, radially inwardly directed flange 46 extending radially inwardly from the circular periphery 44 and disposed in spaced relation to end wall 10, the arrangement being such that seal ring outer flange 34 is held between plate flange 46 and end wall 10, in an annular groove formed therebetween, and in a manner whereby seal ring 22 is restrained against axial movement but is free to move radially in any direction in accordance with the eccentricities of shaft 12.

A short pin 48 is fixedly mounted in flange 46 and end wall 10, extending through a U-shaped groove 50, in the outer flange 34 of upper ring half 24, restraining seal ring 22 from rotating with the rotation of shaft 12. Groove 50 is of sufficient depth to permit the above-discussed freedom of radial movement of seal ring 22.

Retainer plate 40 is constructed with a vertical, central split 52 to facilitate removal and remounting. The left end of plate 40 is shown broken away, there being in the gypsum calciner a plurality of laterally spaced shafts 12 and shaft seal structures 20, and the left-hand plate shown extending and forming also the right-hand plate for an adjacent shaft.

At the bottom edge of retainer plate 40, the thick outer portion 42 is grooved as at 54, to permit the escape of the negligible amount of gypsum which may leak between outer flange 34 and end wall 10.

A novel function has been found to result from the structure of the seal of the invention, when used with material of the nature of calcining gypsum. Gypsum rock, ground to approximately 85% through 100 mesh, when heated in the continuous calciner identified above, has very fluid characteristics which are temporary, and cease when 75% of the water of crystallization has been driven off. This fluid-like ground rock is very capable of leaking through any gap of reasonable tolerance about a rotary shaft. In the seal of the present invention, calcining gypsum readily leaks into and fills the groove 32 on original start-up of the calciner unit. The rate of leakage of gypsum out of the opposite outer side of the groove 32 is, however, very low, this apparently being the result of the gypsum reverting to the non-fluid condition while in the groove. Thus, the gypsum in the groove is providing in combination with the seal 22, an improved means for sealing the opening about the shaft.

Having completed a detailed disclosure of a preferred embodiment of my invention so that those skilled in the art may practice the same, I contemplate that variations may be made without departing from the essence of the invention or the scope of the appended claim.

A method of containing heated calcining gypsum of a fineness of about 85% through 100 mesh in a container having a rotary shaft extending through a wall of said container whereat said calcining gypsum is disposed, comprising the steps of disposing in closely spaced relation around said shaft whereat said shaft extends through said wall a ring with a generally cylindrical inner periphery and having an inwardly opening annular chamber in said inner periphery, allowing said calcining gypsum to flow into said chamber in sufficient quantity to substantially fill said chamber, and retaining within said chamber substantially all of said gypsum which flows into said chamber, whereby an improved seal is provided eliminating undue leakage of said calcining gypsum.

References Cited in the file of this patent

UNITED STATES PATENTS

| | | |
|---|---|---|
| 846,747 | Kerr | Mar. 12, 1907 |
| 967,392 | Kingsbury | Aug. 16, 1910 |
| 1,081,443 | Godfrey | Dec. 16, 1913 |
| 1,194,146 | Cummins | Aug. 8, 1916 |
| 1,530,554 | Gossett | Mar. 24, 1925 |
| 1,673,751 | Lawrence | June 12, 1928 |